(12) United States Patent
Stieglitz et al.

(10) Patent No.: US 7,551,565 B2
(45) Date of Patent: Jun. 23, 2009

(54) USER SEMANTIC OVERLAY FOR TROUBLESHOOTING CONVERGENT NETWORK PROBLEMS

(75) Inventors: Jeremy E. Stieglitz, Menlo Park, CA (US); Jonathan S. Leary, Woodside, CA (US)

(73) Assignee: Cisco Technology, Inc., San Jose, CA (US)

( * ) Notice: Subject to any disclaimer, the term of this patent is extended or adjusted under 35 U.S.C. 154(b) by 590 days.

(21) Appl. No.: 11/072,074

(22) Filed: Mar. 3, 2005

(65) Prior Publication Data

US 2006/0198310 A1 Sep. 7, 2006

(51) Int. Cl.
*H04L 12/26* (2006.01)
(52) U.S. Cl. .................. 370/241; 370/252; 370/259; 370/352
(58) Field of Classification Search ............. 370/353, 370/466, 241–253, 465, 468; 455/420; 379/1–35
See application file for complete search history.

(56) References Cited

U.S. PATENT DOCUMENTS

| | | | | |
|---|---|---|---|---|
| 6,498,791 | B2 * | 12/2002 | Pickett et al. | 370/353 |
| 6,594,277 | B1 * | 7/2003 | Chiang et al. | 370/465 |
| 6,628,666 | B1 | 9/2003 | Pickering et al. | |
| 6,985,722 | B1 * | 1/2006 | Snelgrove et al. | 455/420 |
| 7,274,670 | B2 * | 9/2007 | Hicks et al. | 370/252 |
| 2004/0062204 | A1 * | 4/2004 | Bearden et al. | 370/250 |
| 2004/0073641 | A1 | 4/2004 | Minhazuddin et al. | |
| 2005/0282138 | A1 * | 12/2005 | Dittli | 434/362 |
| 2006/0098625 | A1 * | 5/2006 | King et al. | 370/352 |
| 2006/0104306 | A1 * | 5/2006 | Adamczyk et al. | 370/466 |
| 2006/0221942 | A1 * | 10/2006 | Fruth et al. | 370/356 |
| 2006/0274760 | A1 * | 12/2006 | Loher | 370/395.52 |

OTHER PUBLICATIONS

Cisco Systems, Inc., (White Paper) "NetFlow Services and Applications", 15 pages, printed 2004.
Cisco Systems, Inc., (Overview) "Network-Based Application Recognition", Copyright © 1992-2000, 9 pages.
Cisco Systems, Inc., "Cisco IOS Service Assurance Agent for Voice over IP", Copyright © 1991-2003, 5 pages.
Cisco Systems, Inc., "IP Application Services", Copyright © 1992-2004, Updated Feb. 27, 2003.

* cited by examiner

*Primary Examiner*—Chi H. Pham
*Assistant Examiner*—Shick Hom
(74) *Attorney, Agent, or Firm*—Trellis IP Law Group, PC

(57) ABSTRACT

A convergent network with voice over Internet protocol (VOIP) and voice over wireless local area networks (VoW-LAN) telephones provides users a way for notifying a network administrator of a quality problem in real time together with an indication of the nature of the quality problem. Upon receipt of the notification, the system takes a snap shot of the current network parameters that are associated with the quality problem and provides network statistics for subsequent analysis and troubleshooting. Other callers participating in a call are also notified of the source of the quality problem. In addition, when streaming video or audio users detect a network quality problem, the problem is marked and tagged to indicate the time and the type of quality problem as it is occurring.

23 Claims, 2 Drawing Sheets

USER SEMANTIC OVERLAY FOR TROUBLESHOOTING CONVERGENT NETWORK PROBLEMS

BACKGROUND OF THE INVENTION

The present invention relates to transmission of voice over a network and more particularly to troubleshooting low quality network services for high bandwidth events such as Voice over Internet Protocol (VoIP), Voice over Wireless Local Area Networks (VoWLAN) networks and video transmission.

A converged network integrates data, voice and video traffic onto a single, Internet Protocol (IP) infrastructure. With a converged network, a company can combine their telephone functions with their data management functions and realize an improved return on their investment. With the advent of digital telephone systems, companies can provide employees and customers with improved intelligent voice, data, messaging and mobility applications and services not possible with the public switched telephone network (PSTN) or, as it is often referred to, the plain old telephone system (POTS).

The principal drivers behind converging voice and data networks are reduction in the total cost of network ownership and enhanced features and functions. For example, video telephone calls are now increasingly common and soon users will be able to access video data to watch a movie or a television show on their mobile telephone. However, with the increased availability of high speed Internet and wireless networks combined with voice over Internet protocol (VOIP) technology, converged networks will increasingly shoulder demand for increased bandwidth. Accordingly, one of the key challenges in deploying a converged network is to ensure that each type of user (such as a data user and a telephone user) is provided with high quality network services. Unfortunately, voice traffic demands reliable and consistent service quality and performance because any delay, noise or network congestion will cause audible problems that will have a negative impact on the ability to use and enjoy the converged network.

One solution is to allocate virtually all of the available bandwidth to the voice traffic and relegate other traffic a lower priority when traversing the network. However, this is not an acceptable solution because video and data users also require adequate bandwidth.

Even if the bandwidth is adequate to handle the voice, data and video traffic, voice users may notice other problems with their use of a converged network. For example, voice garbling, line echoes, lost packets that cause gaps of silence, line noise such as clicking, hissing, crackling, cross talk, hum, popping static or screeching may be generated across the network and distort the quality of the voice call. At other times, video users may notice poor buffering or other anomalies in receipt of a video stream.

Wireless networks add additional complexity to the problem of ensuring sufficient quality of service for voice and video users. For example, the connection may suffer from intermittent outages, connections may be dropped or there may be an inability to roam. Also, if the number of users in a certain area is high, it may be impossible to make a connection or to obtain any service for indefinite periods. All of these problems affect user satisfaction and need to be quickly corrected when the problems occur.

Many prior art tools attempt to resolve problems for users of a converged network. Some web-based tools require a user to open a trouble ticket and to define and preliminarily diagnose the problem they experienced. Because of the complexity of such tools, the participation rate has been traditionally low. Even when the users participate, the delay between the problem occurring and the report may render it impossible to determine the network conditions that existed when the problem occurred. Thus, it is difficult, if not impossible, to determine the source of the problem and correct it in a timely manner.

Other tools rely on commercially available tools such as Sniffer Pro, available from Network General Corporation of San Jose, Calif. or the protocol analyzer Ethereal, which is open source software released under the GNU General Public License, to capture and collect packets that define quality of service (QoS) parameters. Unfortunately, packet sniffing systems capture all traffic, all calls whether there are network problems or not. Then, when a problem occurs, significant effort is required to locate the network reports or logs that relate to the problem or to determine the root cause.

Yet additional diagnostic tools are available to monitor voice traffic on converged networks. These diagnostic tools monitor, report and log call quality, dropped calls and similar statistics but require a significant amount of bandwidth to function. Thus, these tools increase the cost of operating a converged network and reduce the savings that companies expect when converting to a converged network.

Clearly, what is needed is a system and method for determining network parameters when a user experiences a network problem during high bandwidth events such as a VoIP or VoWLAN telephone call or video streaming so that the problem can be corrected. Since these problems are most noticeable to voice and video users where real time packet delivery is necessary, whether coupled to the IP infrastructure or a wireless LAN, what is needed is a system and method for real time indication of a network problem and an indication of the type of problem being experienced.

DETAILED DESCRIPTION OF EMBODIMENTS OF THE INVENTION

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Figure 1:
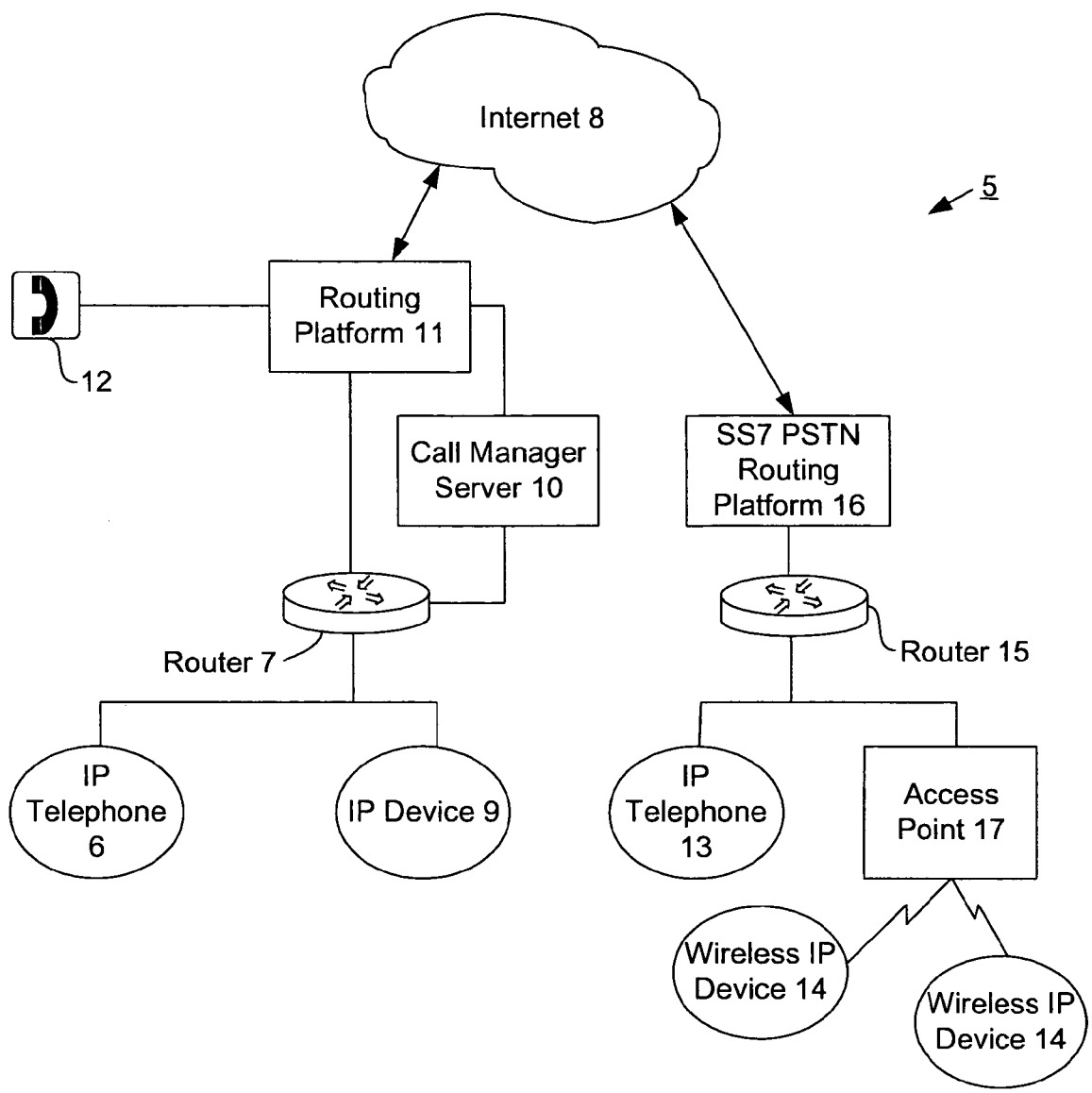
FIG. 1 is a simplified block diagram illustrating one exemplary representative communication network that supports a plurality of internet protocol telephones in accordance with an embodiment of the present invention.

Referring now to the drawings more particularly by reference numbers, a simplified embodiment of a representative convergent network 5 is shown in FIG. 1. It is to be understood that a network capable of meeting the requirements for transmitting toll quality calls and streaming video data will depend on many factors so the actual configuration of network 5 will likely vary depending on the specific capabilities required for a given application. As such, the network illustrated in FIG. 1 is exemplary in nature.

In FIG. 1, an internet protocol (IP) telephone 6 is shown coupled to network router 7. Network router 7 is, in one preferred embodiment, a Cisco router such as the Cisco 2600 access router that provides flexible LAN and WAN configurations. Telephone 6 may be any IP telephone which in one embodiment, by way of example, is the Cisco IP Phone 7960G, commercially available from Cisco Systems, the parent corporation of the assignee of the present application. Telephone 6 is used to transmit voice information over the internet 8 or other networks. Other IP telephony devices, such as IP device 9, may also connect to internet 8 through router 7 to transfer voice, voice and video or video data. For example, device 9 may be a video IP telephone device capable of transferring voice and video images of the participants in a conversation in a real time video stream. In some instances, both telephone 6 and device 9 are video enabled capable of both sending and receiving voice and video data. In other instances, device 9 may be a device for receiving video streams, such as a movie, or voice streams, such as a radio broadcast from a third party source and displayed on telephone 6. In general, telephone 6 and device 9 are either layer 2 or layer 3 network devices having a display screen and an input device for entering information by a user. Although only two IP devices are illustrated in FIG. 1, it is to be understood that virtually an unlimited number of such IP devices may be coupled to multiple switches operating in parallel with router 7.

Network router 7 couples telephone 6 or device 9 to a call management server 10 whenever an inbound or an outbound call involves one or both of telephone 6 or device 9. Server 10 is responsible for providing telephony features and functions, such as messaging and conference calling to IP phones and media processing devices. Server 10 may also provide billing or other functions associated with the call or video stream directed to telephone 6 or device 9.

Sever 10 and router 7 are further coupled to a routing platform 11 that functions as the transfer point for translating between SS7 and IP protocols. In this manner, calls originating on the public switched telephone network (PSTN) may be received at platform 11 from a PSTN telephone 12 or from another IP telephony device via the internet 8. Outbound calls originating at one of the IP devices 6 or 9 may terminate at telephone 12 on the PSTN. The PSTN delivers outside calls to routing platform 11. As used herein, PSTN may include other telephone networks such as ISDN or FDDI. Platform 11 may functions as a voice-over-IP (VoIP) gateway, provide multimedia application support or buffer video traffic.

In another embodiment, server 10 and routing platform 11 are integrated onto a common platform to deliver a high capacity, carrier-class Internet call control gateway based on established voice network signaling system 7 (SS7) technologies. By way of example, in Cisco System devices, the IP and SS7 services are provided in the IOS operating system executing on server 10. SS7 is a worldwide standard adopted by the International Telecommunication Union. SS7 defines the procedures and protocols by which elements in the PSTN exchange information to handle call setup, billing, routing and control. Further, it is preferred that routers 7 and 15 are coupled to their respective servers or routing platforms by a virtual LAN or VLAN to ensure adequate bandwidth to handle the voice or video traffic.

As is further illustrated in FIG. 1, additional IP devices such as IP telephone 13 and wireless IP devices 14 are coupled to internet 8 through router 15 and routing platform 16. Devices 14 are preferably IEEE compliant wireless 802.11b enabled device. A wireless access point base station 17 connects wireless. IP devices to router 15. Preferably, station 17 is a WiFi compliant IEEE802.11b access point. Station 17 functions to authenticate callers and to define a hot spot where wireless communication is allowed. Calls that either initiate or terminate to a wireless device 14 are often referred to as voice over wireless local area network calls or VoWLAN calls.

There is a need to provide seamless interoperability of services and features across both the IP and PSTN networks to achieve widespread acceptance of Internet telephony. The task of delivering digital voice and video data across the various types of networks is complicated by the temporal nature of the network environment. Indeed, if a call must hop back and forth between the PSTN and the Internet, it is difficult to obtain visibility of network parameters when a problem actually occurs. Further, the variety of IP devices further complicates the process of delivering quality audio and video data. Accordingly, the present invention utilizes the key pad associated with an IP telephone or device to generate DTMF tones indicative of a specific type of problem.

The sequence of DTMF tones is translated into a signaling message that is forwarded to the VoIP infrastructure and routed to server 10. If the signaling message were to hit a VoIP to SS7 gateway, it would be translated back to the traditional DTMF tones. Thus, when the IP device detects the DTMF tone sequence it translates the tones into a signaling message and forwards the appropriate message to the server.

Problems on VoIP and VoWLAN calls may take many different forms. While not exhaustive, VoIP and VoWLAN calls may suffer various and differentiated degrees of reduced quality. By way of example, during a call that is transported at least partially over the internet, a user may experience voice garbling, listener echoes, talker echoes or echo(es) at both ends of the call. At other times, during a call, one or all users may lose volume so there is absolute silence, there may be one-way audio, or volume distortions may occur either continuously or intermittently. Other various types of noises that may be classified as clicking, crackling, crosstalk, hissing, humming, popping, motor sound, screeching or static may also be experienced. In addition to these quality problems, call connectivity issues such as pausing or intermittent outages, dropped calls, an inability to roam through the hot spot, line service may not be available, or there may be constant busy signals.

The majority of the time these problems are intermittent in nature and difficult to diagnose. At other times, while easy to diagnose, it is difficult to determine the why certain conditions caused the problem. In order to provide a better real time indication of the problem associated with calls that experience quality problems, the user is best able to tag and mark the problem.

Figure 2:
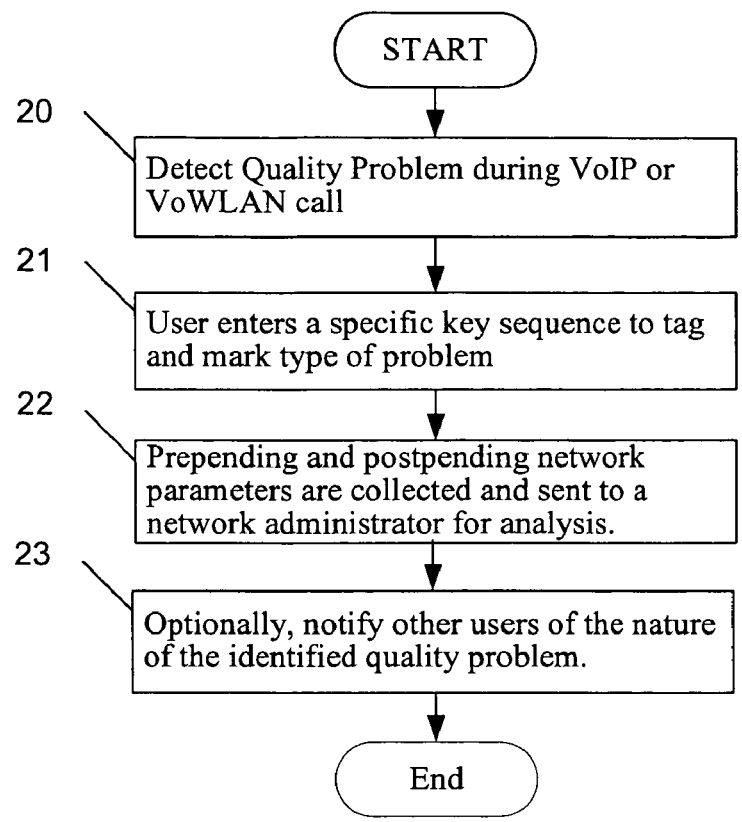
FIG. 2 is a flow diagram illustrating operation of one embodiment of the present invention.

In the real time environment as indicated in FIG. 2, the user of an IP telephone or device detects a problem with the quality of a voice call as indicated at step 20. Upon detection, the user may enter a specific key sequence to indicate when a quality problem is detected (step 21). The key sequence consists of preferably two key entries, although additional entries are contemplated. The first key indicates a tag, which means that a problem has been detected, and the second key entry indicates, or marks, the tag with the type of problem. The mark provides a semantic overlay so that a network administrator may in real time or subsequently determine a source of the quality problem.

The present invention uses a user key-coded system to "tag" and "mark" VOIP or VoWLAN traffic using a keypad to touchtone input. In order to initiate a tag to report various diagnostic, quality and/or troubleshooting data, the user simply enters a key. The tag key is preferably defined and publicized by way of a displayed message or a printed card. Shortly after the tag key is entered, one or more mark keys are entered. By way of example, the user may be prompted to press##5 if a dropped call is experienced, while the user may be prompted to press##6 if call quality was reduced due to static, hissing or other noise. Other key sequences are readily envisioned by one skilled in the art and are not to be limited by the examples described herein.

At the time the key sequence is entered by the user, network parameters are collected and transferred to a network administrator as indicated at step 22. It is preferred that pre-pending network parameters be recovered to indicate network status just prior to when the quality problem occurs. Further, it is necessary to acquire post-pending network parameters to indicate network status for a selected time after the entry of the tag. Pre-pending and post-pending parameters may vary depending on the specific application of network management tools, the topography of the network or other engineering constraints. In general, it is preferred that management tools collect network parameters that define jitter, latency, packet loss, bandwidth demands, buffer status, signal strength, the time the problem occurred, roaming and radio management event times and durations, CPU utilization rates for devices in the transmission path, call load for the associated AP and WAN interfaces and the type of IP device in use by the users. It is also preferred that the management tool select the type of information that is collected. For example, if the semantic mark indicates that the problem is associated with base station 17 being overloaded with other users, there is no need to acquire the jitter or latency parameter at IP device 9, however since WLAN operates over a shared media, collecting radio parameters from adjacent APs and clients will aid in troubleshooting the problem. The selected parameters are archived so that subsequent data mining may yield additional clues as to the cause of a continuing problem.

An optional feature of the present invention, as indicated at step 23, provides notification of the problem to all participants in the call. For example, if it is determined that a call was dropped because one user roamed outside the range of the access point, a message is transmitted to each user and displayed on the display device associated with the IP device or telephone.

Figure 3:
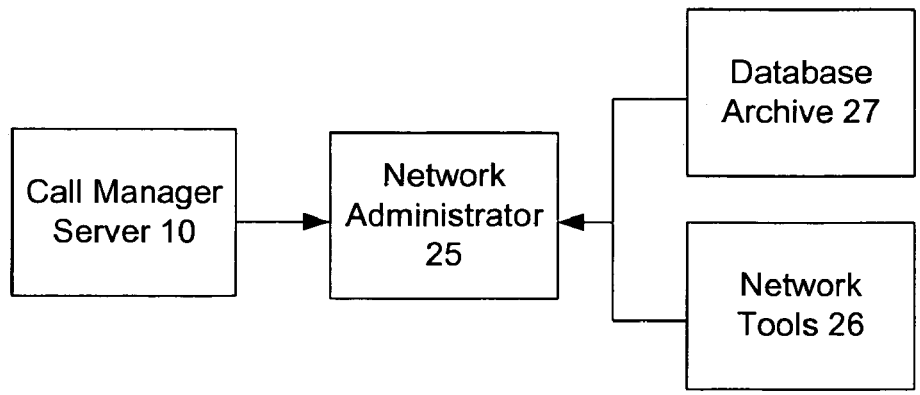
FIG. 3 is a simplified block diagram illustrating one exemplary representative portion of the communication network that supports a plurality of internet protocol telephones and video users in accordance with an embodiment of the present invention.

FIG. 3 illustrates operation of the present invention after server 10 receives key entries. Server 10 notifies a network administrator 25 of the quality problem with the call. Upon receipt, the network administrator 25 collects network parameters for a period prior to the tag being detected from network tools 26. Network tools 26 may include instrumented, automatic diagnostics within the control protocols for VoIP traffic. An example of instrumented diagnostics is the call diagnostics available in the Skinny Client Control Protocol (SCCP), which is a Cisco proprietary protocol used between call manager server 10 and IP telephones 6 and 13 or other IP devices 9 and 14.

It is preferred that administrator 25 continue to collect network parameters for an additional period or alternatively for the remaining duration of the call across the network components. Thus, if a user of wireless device 14 were to call a user at IP telephone 6, the network administrator 25 would obtain parameters for wireless device 14, access point 17 as well as any nearby co-channel or sensor access points, routers 15 and 7, routing platforms 11 and 16 as well as intermediate internet hops. This information will be archived in archive database 27 for subsequent data mining.

In other embodiments, routing platform 16 comprises a unified call control systems that combine SS7 with asynchronous transfer mode (ATM) virtual circuit switching capabilities.

Server 10 implements a server-side packet detection for special character combinations. Upon invocation of this combination, the server system creates a diagnostic ticket event that is sent to network administrator 25. This event ticket initiates the process of automatically logging traffic a predetermined number of seconds prior to this mark to a special report, and also generates admin-configurable actions, such as SNMP faults, SMTP messages, and SYSLOG updates. Upon receipt of the event ticket, the network administrator 25 performs network diagnostics to determine if there are optimal changes to the QOS settings for a particular network node/call system. The network administrator 25 also coordinates any network audits and reports for the network administrator. If any service level agreement monitoring is required, network tooling systems, such as SKINNY, record call quality parameters.

Additional key extensions may be used to augment the tagged markings for data such as service level agreements if poor bandwidth, busy signals or similar network problems are indicated. These key extensions may be in response to prompts delivered to the user who first tagged the quality problem. Server 10 or network administrator 25 may deliver these prompts which may be in the form of a voice query that requests the user to enter one of a plurality of keys to indicate a corresponding plurality of problem descriptions.

The present invention makes use of present, inline technology (the phone and the keypad), and easy-to-perform user behaviors (key enter to generate DTMF touch tones) to generate quality tags and markers. Unlike system-loading data logging and always-on packet inspection, the present invention utilizes network resources only when needed, and only when call quality problems are occurring. By creating a rich semantic overlay, call problems can be more closely identified and can be "marked" in the data packet process automatically. This semantic overlay gives the administrator the exact location in time and in the network where the problem occurs.

In another embodiment, the key sequence is utilized to indicate when streaming media suffers from poor transmission rate and is not streaming properly. In this embodiment, an IP device is used to notify server 10 of the quality problem and then to easily and quickly describe the type of problem being experienced. Thus, in operation, if a user is viewing a movie on an IP device and the streaming is not continuous, the user can tag the problem and indicate that the stream is too slow to maintain a continuous stream. In other instances, the tag may indicate that audio problem where the audio track is not synchronized with the video track.

In yet another embodiment of the present invention, the semantic key sequence is readily extended to other applications. For example, in addition to defining quality semantics for VoWLAN or VOIP traffic, the semantic overlays may be used to provide additional data tagging for other criteria around security, QOS, content services, configuration or audio tones by way of illustration.

Although the invention has been described with respect to specific embodiments thereof, these embodiments are merely illustrative, and not restrictive of the invention. For example, the network may include components such as routers, switches, servers and other components that are common in such networks. Further, these components may comprise software algorithms that implement connectivity functions between the network device and other devices.

The executable code described herein may be implemented in any suitable programming language to implement the routines of the present invention including C, C++, Java, assembly language, etc. Different programming techniques can be employed such as procedural or object oriented. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

As used herein the various databases, application software or network tools may reside in one or more server computers and more particularly, in the memory of such server computers. As used herein, "memory" for purposes of embodiments of the present invention may be any medium that can contain, store, communicate, propagate, or transport the program for use by or in connection with the instruction execution system, apparatus, system or device. The memory can be, by way of example only but not by limitation, an electronic, magnetic, optical, electromagnetic, infrared, or semiconductor system, apparatus, system, device, propagation medium, or computer memory.

Reference throughout this specification to "one embodiment," "an embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method, comprising:
   establishing a communication session over which streaming media travels in real time as packets over a network, the communication session being established using a device having an input through which real time information about the communication session is entered;
   receiving an indication of a quality problem with the streaming media traveling over the network in the communication session, the quality indication being provided in real time from the input of the device being used in the communication session when the quality problem is experienced by a user of the device;
   receiving from the device input during the communication session, a semantic indication associated with the quality indication for the communication session, the semantic indication comprising information related to an occurrence of the quality problem during the communication session;
   selecting network parameters for collection based upon the received quality and semantic indications;

acquiring the selected network parameters for the communication session; and providing the acquired network parameters, the quality indication, and the semantic indication for determination of a source of the quality problem.

2. The method of claim 1, wherein the streaming media comprises a voice call or a videoconference call.

3. The method of claim 1, wherein the determination of the source comprises associating the semantic indication with at least one network parameter selected from jitter, latency, packet loss, bandwidth demands, buffer status, signal strength, a time the quality problem occurred, roaming and radio management event times and durations, central processing unit (CPU) utilization rates for devices in a transmission path, call load for an associated access point and wide area network (WAN) interface, and information about the device in use.

4. The method of claim 1, further comprising detecting the quality problem.

5. The method of claim 1, wherein the receiving the semantic indication comprises detecting a signaling message.

6. The method of claim 5, wherein the signaling message is derived from a dual-tone multi-frequency (DTMF) touch tone.

7. The method of claim 5, wherein the signaling message is derived from at least two different dual-tone multi-frequency (DTMF) touch tones.

8. The method of claim 1, wherein the acquiring the selected network parameters further comprises acquiring network parameters from a time prior to the receiving of the quality indication.

9. The method of claim 8, wherein the acquiring the selected network parameters further comprises acquiring network parameters from each network element through which the quality indication passes from a time following the receiving of the quality indication such that each network element appends statistical information relating to operational parameters of each network element.

10. The method of claim 1, wherein the semantic indication further comprises temporal information related to the occurrence of the quality problem.

11. The method of claim 1, wherein the semantic indication further comprises location information related to the occurrence of the quality problem.

12. The method of claim 1, further comprising storing the acquired network parameters together with the quality indication and the semantic indication in a database for subsequent analysis.

13. The method of claim 1, wherein the streaming media comprises a movie or an audio program.

14. A telecommunication system for monitoring a quality of a call transmitted to an Internet protocol (IP) device in real time as packets during the call, the telecommunication system comprising:

a server configured to receive in real time from an input of the IP device being used for the call, an indication of a quality problem when the quality problem is experienced at the IP device by a user of the IP device, the server being further configured to receive, using the IP device input during the call, a semantic indication associated with the quality indication, wherein the semantic indication comprises information related to an occurrence of the quality problem during the call;

means, associated with the server, for collecting network parameters for the call and that are associated with the quality indication and the semantic indication; and means for providing the network parameters, the quality indication, and the semantic indication for determination of a source of the quality problem.

15. The telecommunication system of claim 14, wherein the call comprises a voice call or a videoconference call.

16. The telecommunication system of claim 14, further comprising means for detecting the quality problem.

17. The telecommunication system of claim 14, further comprising means, linked to a plurality of network tools, for obtaining pre-pending and post-pending network parameters such that such network parameters describe a network nature prior to the indication of the quality problem and for a selected period of time thereafter.

18. The telecommunication system of claim 14, further comprising a dual-tone multi-frequency (DTMF) key configured to generate a touch tone for providing the quality indication.

19. The telecommunication system of claim 14, further comprising means for detecting packets generated in response to a dual-tone multi-frequency (DTMF) touch tone received from the IP device input during the call.

20. The telecommunication system of claim 14, further comprising wireless Internet protocol (IP) devices.

21. An apparatus, comprising:
one or more processors; and
logic encoded in one or more tangible media for execution by the one or more processors, and when executed operable to:
establish a communication session over which streaming media travels in real time as packets over a network, the communication session being established using a device having an input through which real time information about the communication session is entered;
receive an indication of a quality problem with streaming media that travels over a network in a communication session, the quality indication being provided in real time from the input of the device being used in the communication session when the quality problem is experienced by a user of the device;
receive from the device input during the communication session, a semantic indication associated with the quality indication for the communication session, the semantic indication comprising information related to an occurrence of the quality problem during the communication session;
select network parameters for collection based upon the received quality and semantic indications;
acquire the selected network parameters for the communication session; and
provide the acquired network parameters, the quality indication, and the semantic indication for determination of a source of the quality problem.

22. The apparatus of claim 21, wherein the network comprises a convergent network having voice over Internet protocol (VOIP) and voice over wireless local area network (VoWLAN) telephones.

23. The apparatus of claim 22, wherein the logic when executed is further operable to notify a second user on the convergent network of the quality problem.

* * * * *